United States Patent [19]

Sanchez

[11] Patent Number: 4,889,313
[45] Date of Patent: Dec. 26, 1989

[54] UTILITY SHUTOFF METHOD AND DEVICE

[76] Inventor: Robert Sanchez, 11574 E. Beverly Blvd., Whittier, Calif. 90601

[21] Appl. No.: 170,772

[22] Filed: Mar. 21, 1988

[51] Int. Cl.⁴ ............................................. F16K 31/46
[52] U.S. Cl. ..................................... 251/74; 251/294; 137/595
[58] Field of Search ............................ 251/66, 74, 294; 137/595

[56] References Cited

U.S. PATENT DOCUMENTS

| | | | |
|---|---|---|---|
| 1,648,662 | 11/1927 | Shadrich | 251/74 X |
| 2,630,818 | 3/1953 | McNol | 251/66 X |
| 2,665,714 | 1/1954 | Greenwood | 251/74 X |
| 3,378,081 | 4/1968 | O'Reilly | 251/294 X |
| 4,425,823 | 1/1984 | Kulischenko et al. | 137/595 X |

Primary Examiner—A. Michael Chambers
Assistant Examiner—John C. Fox
Attorney, Agent, or Firm—Edgar W. Averill, Jr.

[57] ABSTRACT

A device for turning off valves for utilities such as gas and water from a remote location in the event of an earthquake or other emergency. The device has two spring loaded valve assemblies, each of which has a valve stem held away from a valve seat by a latch. When the latch is tripped, the valves close. Cables are passed from a pull ring accessible to the operator and pass through conduits to the spring loaded valves. In the event of an earthquake or other emergency, the pull ring is pulled and the utilities are shut off.

6 Claims, 1 Drawing Sheet

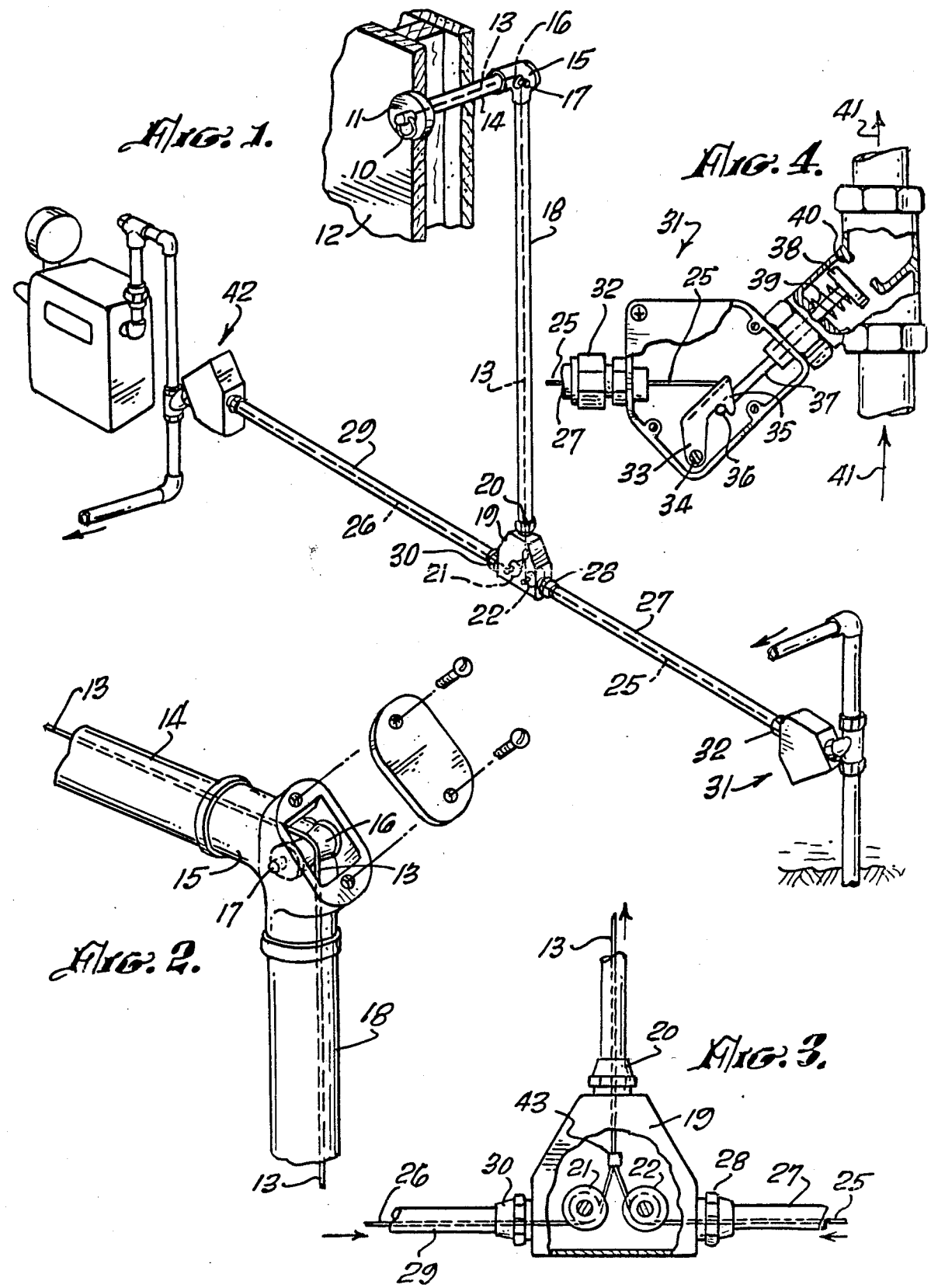

UTILITY SHUTOFF METHOD AND DEVICE

BACKGROUND OF THE INVENTION

The field of the invention is plumbing supplies and the invention relates more particularly to remotely controlled valves.

In the event of a major earthquake, it is common for appliances, such as water heaters, to be upset and for the water and gas supplies to such water heaters be broken. This can cause a very serious potential hazard as gas escapes and fills an area with a potentially explosive mixture. Furthermore, water escaping from a broken water line can cause extensive damage to floors, sub-floors and cabinets.

It is common instruction for the homeowner to be advised to turn off the gas and water lines to the house, but unfortunately the typical homeowner is unfamiliar with the location of such valves and even if familiar with such location, the valves are not readily manipulated. Typically, the gas valve is operated by turning a metal tab 90°. Such valve can only be turned with the assistance of a wrench and in an emergency, many times such wrench is not available. Furthermore, the wrench may well be in the garage where the water heater is located and may well constitute an area of substantial hazard leaving the homeowner with a dilemma. If the water valve has to be shut off at the street, it can only be shut off with a special tool comprising a long-handled wrench which the average homeowner does not possess.

There is, thus, a need for a method of quickly turning off utilities which may be operated without the need of special tools and which is readily accessible to the home, apartment or business owner.

Remote shutoff valves have been used in a series of patents issued to Henry Sieben which show numerous valves for this purpose as in U.S. Pat. Nos. 1,746,801; 1,716,535; 1,591,241; 903,794; 938,613 and two related patents, namely, 1,590,844 and 1,658,099. The typical emergency caused by earthquakes, however, requires the shutoff of multiple utilities, such as gas and water lines, at the same time.

SUMMARY OF THE INVENTION

It is an object of the present invention to provide a rapid and easy method for turning off utilities, which method does not require the use of tools.

It is another object of the present invention to provide a utility shutoff device which is capable of shutting off two utilities at the same time.

The present invention is for a device for turning off valves for utilities, such as gas and water, from a remote location in the event of an earthquake or other emergency. The device includes a first spring loaded valve assembly having a valve, a valve seat and a valve stem. The valve and valve stem are urged by a spring toward a closed position and the valve is held open by a latch. A first hollow conduit is affixed to the first valve assembly at one end and to a hollow tee member at the other end. A second hollow conduit is affixed to the hollow tee member at one end and to a second spring loaded valve assembly at the other end. A third hollow conduit is also affixed to the hollow tee member and terminates at an area convenient to the operator. A first cable is affixed to the holding latch of the first valve assembly and passes through the conduit to the hollow tee. A second cable assembly is affixed to the holding latch of the second valve assembly and also passes through a hollow conduit to the hollow tee. A third cable is affixed to the first and second cables and passes from the hollow tee through the third hollow conduit and has a pull ring extending outside of the conduit, which pull ring is accessible to the operator. To shut off the valves, the pull ring is pulled and this action travels through the third, second and first cables and trips the two spring loaded valve stem and valve assemblies thereby closing two utilities at the same time such as a gas line and a water line. Preferably, the first and second hollow conduits are in line and the third conduit is at about a right angle to the first and second conduits. Also, preferably, rollers are provided within the hollow tee to reduce the friction in the movement of the cables within the conduits.

BRIEF DESCRIPTION OF THE DRAWINGS

FIG. 1 is a perspective view of the device for turning off valves for utilities of the present invention.

FIG. 2 is an enlarged perspective view of an elbow and roller assembly of the device of FIG. 1.

FIG. 3 is an enlarged front view, partially cut away of the hollow tee member of the device of FIG. 1.

FIG. 4 is an enlarged cross-sectional view of a valve assembly of the device of FIG. 1.

DESCRIPTION OF THE PREFERRED EMBODIMENTS

The device for turning off valves for utilities of the present invention is shown in perspective view in FIG. 1. The device is accessible to the user by an exposed pull ring 10 which is mounted in a plate 11 held on the surface of a wall 12. Pull ring 10 is attached to a cable 13 within a length of conduit 14. Length 14 is affixed to a tee 15 which is shown in enlarged perspective view in FIG. 2. There it can be seen that the cable 13 passes over a roller 16 which is preferably narrowed in the middle to guide cable 13 to the center of roller 16. Roller 16 is rotatingly held on a pin 17 supported by tee 15. Cable 13 passes through a hollow conduit 18 which is connected to a hollow tee member 19 which is shown in enlarged view in FIG. 3. Conduit 18 is affixed to hollow tee member 19 by a conventional fitting 20. Hollow tee member 19 includes a pair of rollers 21 and 22 which are held so that their axes of rotation 23 and 24 are at a right angle in respect to cable 13 or with respect to cables 25 and 26. Cable 25 passes through a hollow conduit 27 which is affixed to hollow tee member 19 by a fitting 28. Similarly, cable 26 passes through a hollow conduit 29 which is affixed to hollow tee member 19 by a fitting 30. As shown best in FIG. 4, hollow conduit 27 is affixed to a spring loaded valve assembly 31 by a fitting 32. Cable 25 is attached to the end of a holding latch 33 which is pivoted at pin 34 and which has a hook 35 which holds a pin 36 attached to a valve stem 37. Valve stem 37 has a valve 38 at its lower end. Above valve 38 is a spring 39 which urges valve 38 toward valve seat 40. The water flows in the direction of arrows 41 and passes between valve 38 and valve seat 40 in normal operation. When cable 25 is pulled, the holding latch 33 releases pin 36. Valve stem 37 and valve 38 are urged toward valve seat 40 by spring 39 thereby turning off the flow of water. Once the emergency has been resolved, valve stem 37 can be opened by pulling pin 36 so that it once again fits into hook 35 of latch 33. The gas valve 42 is of identical construction as valve assembly 31 and, thus, is not described again.

As shown best in FIG. 3, cables 25 and 26 are affixed to cable 13 by a crimp sleeve 43 and cable 26 is, in fact, continuous with cable 13. By providing a right-angled pull with respect to cable 13 and cables 25 and 26, the two holding latches are pulled at the same time. If one latch is released before the second latch, that further reduces the pull and increases the release of the second latch. Of course, the conduits 27 and 29 may include tees, such as tee 15, with rollers, such as roller 16, so that the cable may be directed between the pull ring and the gas line in an unobtrusive manner. It is preferable that the shutoff valves 31 and 42 be located near the source of utilities to the property so that a rupture in a gas or water line may be downstream with respect to the shutoff valves 31 and 42.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A device for turning off valves for utilities, such as gas and water, from a remote location in the event of an earthquake or other emergency, said device comprising:
    a first spring loaded valve assembly having a valve, a valve seat and a valve stem, said valve and valve stem urged by biasing means toward a closed position where the valve is against the valve seat and holdable in an open position by a holding latch which holds the valve away from the valve seat;
    a first hollow conduit having a first end and a second end, said first end being affixed to said valve assembly;
    a hollow tee member affixed to said second end of said first hollow conduit;
    a second hollow conduit having a first end and a second end, said first end being affixed to said hollow tee member;
    a second spring loaded valve assembly affixed to said second end of said second hollow conduit, said second spring loaded valve assembly having a valve, a valve seat and a valve stem, said valve and valve stem urged by biasing means toward a closed position where the valve is against the valve seat and holdable in an open position by a holding latch which holds the valve away from the valve seat;
    a third hollow conduit having a first end and a second end, said first end being affixed to said hollow tee member;
    a first cable affixed at one end to the holding latch of said first valve assembly, said first cable passing from its point of attachment to said holding latch through said first hollow conduit into said hollow tee member;
    a second cable affixed at one end to the holding latch of said second valve assembly, said second cable passing from its point of attachment to said holding latch through said second hollow conduit into said hollow tee member; and
    a third cable affixed at one end to said first and second cables and extending from said hollow tee member through said third hollow conduit, said third cable having a pull handle on its other end whereby when the pull handle is pulled, the holding latches of said first and second spring loaded valve assemblies are released closing the first and second valves.

2. The device for turning off valves for utilities of claim 1 wherein said first and second hollow conduits exit the hollow tee in opposite and aligned directions.

3. The device for turning off valves for utilities of claim 2 wherein said third conduit exits the hollow tee at about a right angle from the first and second hollow conduits.

4. The device for turning off valves for utilities of claim 3 wherein said hollow tee has a pair of rollers, each of said rollers having an axis of rotation and each of said rollers being rotatingly held within said hollow tee so that their axes of rotation are at a right angle to the line of the first and second conduits and positioned so that the outer surface of said pair of rollers is aligned with the first and second cables so that the cables pass smoothly over said first and second rollers.

5. The device for turning off valves for utilities of claim 1 wherein said second and third cables comprise a single cable.

6. A device for turning off valves for utilities, such as gas and water, from a remote location in the event of an earthquake or other emergency, said device comprising:
    a spring loaded water valve assembly having a valve, a valve seat and a valve stem, said valve and valve stem urged by biasing means toward a closed position where the valve is against the valve seat and holdable in an open position by a holding latch which holds the valve away from the valve seat;
    a first hollow conduit having a first end and a second end, said first end being affixed to said valve assembly;
    a hollow tee member affixed to said second end of said first hollow conduit, said hollow tee member having first and second rollers therein;
    a second hollow conduit having a first end and a second end, said first end being affixed to said hollow tee member and said first end being aligned with the second end of the first hollow conduit;
    a spring loaded gas assembly affixed to said second end of said second hollow conduit, said second spring loaded gas assembly having a valve, a valve seat and a valve stem, said valve and valve stem urged by biasing means toward a closed position where the valve is against the valve seat and holdable in an open position by a holding latch which holds the valve away from the valve seat;
    a third hollow conduit having a first end and a second end, said first end being affixed to said hollow tee member and oriented at about a right angle to said first and second hollow conduits at their point of attachment to said hollow tee member;
    a first cable affixed at one end to the holding latch of said first valve assembly, said first cable passing from its point of attachment to said holding latch through said first hollow conduit into said hollow tee member and around the first roller therein;
    a second cable affixed at one end to the holding latch of said second valve assembly, said second cable passing from its point of attachment to said holding latch through said second hollow conduit into said hollow tee member and around the second roller therein; and a third cable affixed at one end to said first and second cables and extending from said hollow tee member through said third hollow conduit, said third cable having a pull handle on its other end whereby when the pull handle is pulled, the holding latches of said first and second spring loaded valve assemblies are released closing the first and second valves.

* * * * *